Aug. 30, 1927.

A. ST. J. BACON 1,641,062

RAT TRAP

Filed March 21, 1925

Inventor
A. S. Bacon
By C. A. Snow & Co
Attorneys

Patented Aug. 30, 1927.

1,641,062

UNITED STATES PATENT OFFICE.

ADOLPHUS ST. JOHN BACON, OF FAIR HAVEN, NEW YORK.

RAT TRAP.

Application filed March 21, 1925. Serial No. 17,301.

This invention relates to rat traps and more particularly to those of the dead fall type.

The object of the invention is to provide a simple, strong trap of this character which will effectively entice rats into it and after they enter and grab the bait a weight will fall and kill them.

Another object is to provide a trap of this character which has no springs or delicate parts to get out of order or be broken and which may be used in trapping small as well as large animals.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
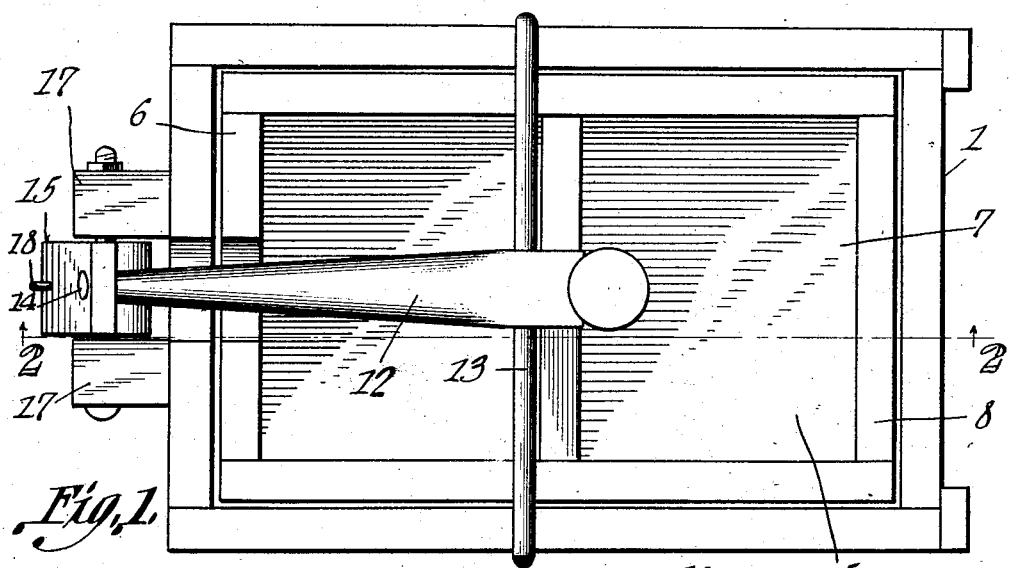
Figure 2:
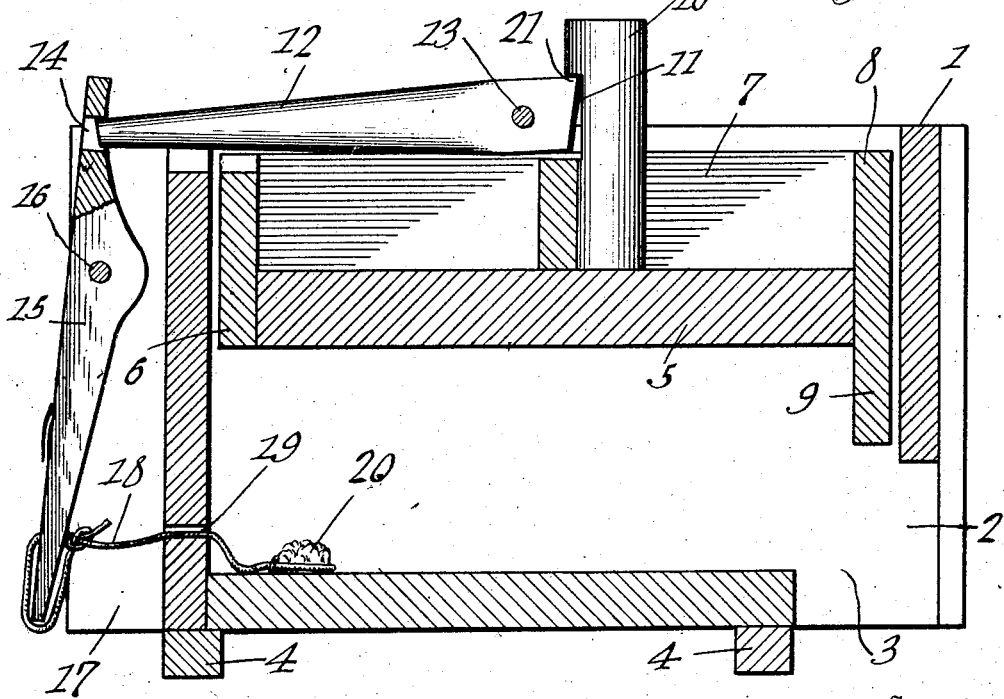

Figure 1 represents a plan view of a trap constructed in accordance with this invention; and Fig. 2 is a longitudinal vertical section taken on the line 2—2 of Fig. 1.

In the embodiment illustrated a box-like structure 1 is shown preferably rectangular in form having an opening 2 in the bottom of one end wall thereof and another opening 3 in the bottom of the box as is shown clearly in Fig. 2. These openings register and form an entrance for the animal to be trapped. The box 1 is shown supported on cleats 4 secured to the outer face of the bottom thereof at its front and rear ends but obviously it may be supported by any suitable means.

The top of the box is open and has mounted to move therein a vertically reciprocating plunger 5 which has an upstanding wall 6 surrounding it to form a weight receiving chamber 7. The front wall of this plunger shown at 8 extends below the lower face of the plunger 5 and forms a closure 9 for the opening 2 when the plunger is in lowered position. A post 10 rises from the center of the plunger 5 and has a notch 11 in one side wall thereof to receive one end of a trigger 12 carried by a rod 13 which extends transversely through the trigger and has its ends designed to rest on the upper edges of the side walls of the box 1 as shown in Fig. 1 and when in this position supports the plunger in elevated position. This trigger 12 tapers toward its rear end and projects at said end beyond the rear of box 1 and is designed to be inserted in an aperture 14 formed in a lever 15 fulcrumed intermediate its ends at 16 between two upstanding cleats 17 secured to the outer face of the rear wall of the box 1 in laterally spaced relation as shown clearly in Fig. 1. This lever 15 is preferably tapered in thickness at both its upper and lower end and has a cord 18 secured to its lower end and extended through an aperture 19 in the rear wall of the box and is designed to carry a bait 20 located within the box. This cord 19 is of such length that when a pull is exerted on the bait 20 the lever 15 will be swung inwardly and its outer end outwardly thereby releasing the trigger 12 which permits the weighted plunger 5 to quickly descend into the box 1 and trap the animal grasping the bait. It will of course be understood that when this plunger drops onto the animal it will not only be trapped but killed.

The inner end of the trigger 12 is preferably beveled to provide a nose 21 for engaging the upper wall of notch 11 so that when the lever swings outwardly and releases trigger 12 this trigger will be quickly disengaged from the plunger the weight of which operates to tilt the trigger upward and permit the plunger to drop quickly onto the animal which pulls the bait.

It will thus be seen that this trap which is of the dead fall type is strong and reliable and cheap to manufacture and which has nothing about it to arouse the suspicion of a rat or other animal, the odor of the bait 20 attracting them and causing them to enter through the openings 2 and 3 and after they get back into the box the grabbing of the bait and the pull exerted thereon will operate to release the plunger which will drop onto them and immediately kill them.

It is of course understood that suitable weights are to be placed in the chamber 7 so that the plunger will be heavy enough to kill the rat or other animal when it drops onto it.

I claim:—

In a trap, a box-like body having its lower front wall cut away and having its bottom cut away adjacent to the first mentioned cut away portion to provide an entrance opening, cleats for supporting the body portion in spaced relation with a supporting surface, a vertical reciprocating plunger operating in the body portion, a front wall on the plunger and extending below the plunger and adapted to move through the cut out portion in the bottom to close the entrance, said plunger adapted to move to engage the bottom of the body, and means for normally holding the plunger in a set position.

In testimony that I claim the foregoing as my own, I have hereto affixed my signature.

ADOLPHUS ST. JOHN BACON.